(No Model.)
J. T. MORRIS, Jr.
CLAMPING DEVICE FOR ELASTIC TIRES.
No. 469,165. Patented Feb. 16, 1892.
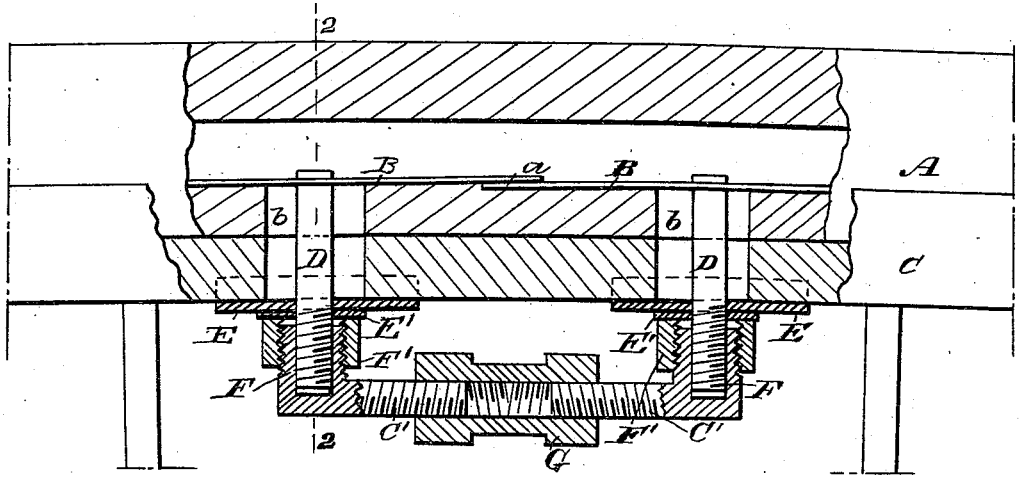
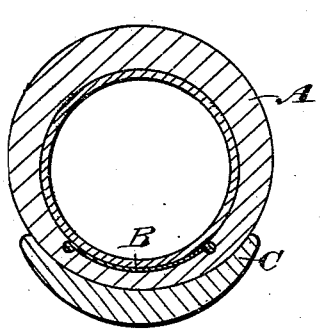
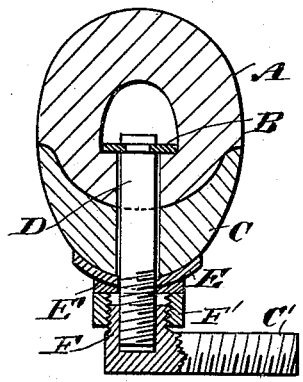
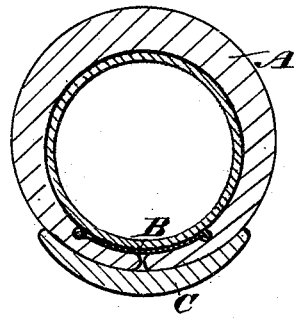
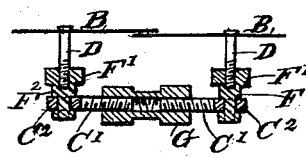
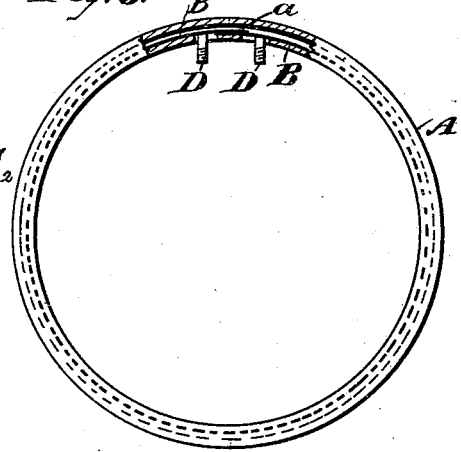
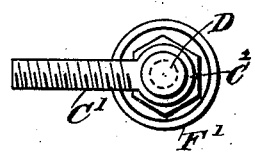
WITNESSES:
INVENTOR:
ATTORNEYS

UNITED STATES PATENT OFFICE.

JESSE T. MORRIS, JR., OF PORTSMOUTH, VIRGINIA.

CLAMPING DEVICE FOR ELASTIC TIRES.

SPECIFICATION forming part of Letters Patent No. 469,165, dated February 16, 1892.

Application filed October 6, 1891. Serial No. 407,849. (No model.)

*To all whom it may concern:*

Be it known that I, JESSE T. MORRIS, Jr., of Portsmouth, in the county of Norfolk and State of Virginia, have invented a new and useful Clamping Device for Elastic Tires, of which the following is a full, clear, and exact description.

This invention relates to an improved device for securing the elastic tires of bicycle-wheels in place on the wheel-rims without cement; and it consists in the construction and combination of parts, as hereinafter described and claimed.

Reference is to be had to the accompanying drawings, forming a part of this specification, in which similar letters of reference indicate corresponding parts in all the figures.

Figure 1 is a partial side elevation of a bicycle-wheel and an elastic tire, partly broken away and in section and showing the clamping device applied. Fig. 2 is a transverse section of the same, taken on the line 2 2 in Fig. 1, showing part of the clamping device in a slightly-changed position. Fig. 3 is a side view, partly broken away and in section, of the elastic tire, showing the clamping device applied. Figs. 4 and 5 are transverse sectional views showing modified constructions of the wheel-rim and tire with the clamping device applied. Fig. 6 is a side view in section, reduced, showing a modified means for drawing toward each other the end portions of a clamping-ring that is an essential feature of the invention; and Fig. 7 is an enlarged reverse plan view of a portion of the device shown in Fig. 6.

As usually constructed, elastic tires for bicycles and other similar wheeled vehicles are made of such a diameter relative to the channeled rim of the wheels that they require to be considerably expanded in order that they may be placed in position, and when seated are still in a stretched condition. This expanded condition of the tire frequently causes a gaping crevice or fissure to be produced therein, as the result of a cut or puncture in the tread of the tire due to impact on a sharp stone or like obstacle when in service, resulting in a permanent injury to the tire.

Commonly the elastic tires of bicycles are attached by cement to the wheel-rims, and from rough service often become loose while on the road, so as to partly or entirely disable the vehicle. The present invention will afford means to clamp an elastic tire to the wheel-rim throughout its circumference without using cement and hold the parts together with the tire in an unstretched condition, so that cuts or punctures in the tire will not be expanded and the durability of the tire be considerably increased. Furthermore, the tire may be quickly tightened in place or removed, the improvement being applicable to all kinds of tubular or hollow tires that are elastic or slightly yielding, as will appear in the detailed description of the several figures of the drawings.

The tire A is made continuous and may be formed variously, as shown in cross-section in Figs. 2, 4, and 5. Within the continuous hollow tire A there is an elastic ring of metal embedded when the tire is formed, as shown at B in Fig. 4, or, preferably, the ring is inserted in a slit or aperture in the tire, so that said comparatively thin ring of metal will lie in contact with the inner surface on the side nearest to the wheel-rim C. As shown in Fig. 1, the clamping-ring B is not integral, but has its ends lapped, as at $a$, so that these terminal portions may slide together. At a proper distance from each of the ends $a$ on the clamping-ring B a stud-bolt D is secured by one end, which studs project in the same direction and pass through slots $b$ in the tire A, and also through coincident slots formed in the wheel-rim C, the threaded ends of the studs projecting from the inner side of said rim. Upon each stud-bolt D a perforated cover-plate E is placed, these plates being curved, so as to adapt them to bear closely upon the inner surface of the wheel-rim and protect the slots $b$, and on the plates washers E' are imposed that engage the stud-bolts. On each stud-bolt a hub-nut F is secured, which nuts have each a lateral bolt-extension C', and upon the hubs that are exteriorly threaded jam-nuts F' are placed. The projecting extensions C' are cut with oppositely-pitched threads, and on them is placed a sleeve-nut G, threaded to mate the right and left hand threads on the bolt ends, which will cause the studs D to be moved in the slots $b$ when said nut is rotated.

To clamp the tire A upon the wheel-rim C, the tire is sprung upon the latter and is of such a proportionate diameter thereto that it will loosely engage the same. When the tire is in place, the stud-bolts D should project from the inner surface of the rim C, as before explained, and the parts connected, as shown in Fig. 1. The rotation of the sleeve-nut G in a direction that will draw the ends of the bolt-extensions C' toward each other will contract the diameter of the ring B, and thereby clamp the tire A on the rim C throughout its surface of contact thereon.

It will be evident that the described means for holding the tire A in place on a wheel-rim C will leave the tread portion of the tire unstretched, so that a transverse cut in the outer surface of the tire will not result in a gaping fissure, but will be closed by the construction of the clamping-ring B, so that a tire may be worn till it is too thin for service without a rupture.

If the clamping-ring B is to be used in connection with an elastic tire of the tubular forms shown in Figs. 4 and 5, the ring may be embedded in the tire when the latter is constructed, and the stud-bolts D, that have been secured to project from the ring, will extend through the slots in the tire and rim of the wheel and be connected by either of the contracting devices shown. If the tire is constructed with a longitudinal slit in the portion having contact with the rim of the wheel, as shown in Fig. 5, the clamping-ring may be readily introduced through said slit and have a bearing on the inner surface of the tire and the stud-bolts may be similarly connected to the ring. In either instance the ring is given a curvature corresponding to that of the tire.

The modified means for drawing the stud-bolts D toward each other that is shown in Figs. 6 and 7 consist in an extension of the hub-nuts F', so as to produce a shank $F^2$ on their lower portions, and reducing the body of said shanks near their lower ends to adapt each to pass through an eye $C^3$, formed on the end of the bolts C', which latter may be aligned and the sleeve-nut G placed upon them, as before explained. The shanks $F^2$ are secured in place by a fixed washer on their free terminals that loosely bears on the bolt-eyes $C^2$, so that the nuts F' and their shanks may be rotated to secure the plates E in place and hold the ends of the plate B in clamped adjustment.

Having thus described my invention, I claim as new and desire to secure by Letters Patent—

1. The combination, with a wheel having a concave slotted rim and a hollow elastic tire having slots coinciding with the slots of the rim, of a ring in the tire having overlapping ends and provided with stud-bolts projecting through the slots of the tire and rim, nuts on the stud-bolts, oppositely-threaded bolts secured to the said nuts, and a sleeve-nut engaging the said oppositely-threaded bolts, substantially as described.

2. The combination, with a wheel having a concave rim and slots intersecting the concavity in the rim and a hollow elastic tire on the rim having slots coinciding with the slots in the rim, of a contractible ring in the tire having overlapping ends, stud-bolts secured to the ring and projecting through the slots in the tire and rim of the wheel, hub-nuts on the lower ends of the stud-bolts provided with jam-nuts and having oppositely-threaded extensions, and a sleeve-nut engaging the threaded extensions of the hub-nuts, substantially as described.

3. The combination, with a wheel having a concave rim and a hollow elastic tire thereon, the ring and tire having coinciding slots, and a contractible ring within the tire having lapped ends, of stud-bolts secured near said ends and passing through the slots in the tire and wheel-rim, plates on the bolts covering the slots and provided with washers, hub-nuts on the bolts provided with jam-nuts and having lateral oppositely-threaded bolt extensions, and an oppositely-threaded sleeve-nut engaging the lateral extensions of the hub-nuts, substantially as described.

JESSE T. MORRIS, JR.

Witnesses:
W. A. FENTRESS,
W. N. WHITE.